United States Patent [19]
Laudereau et al.

[11] Patent Number: 5,088,000
[45] Date of Patent: Feb. 11, 1992

[54] ELECTRONIC THERMAL RELAY AND APPROPRIATE THERMAL ELEMENT

[75] Inventors: Guy Laudereau, Arcueil; Gilles Baurand, Montesson la Borde; Isabelle Lubin, Rueil Malmaison; Sylvie Gay, Chatou; Jacques Berdah, Paris, all of France

[73] Assignee: Telemecanique, France

[21] Appl. No.: 458,023

[22] Filed: Dec. 28, 1989

[30] Foreign Application Priority Data

Jan. 5, 1989 [FR] France ................. 89 00067

[51] Int. Cl.$^5$ ............................................. H02H 5/04
[52] U.S. Cl. ................................. 361/103; 361/93; 361/380; 338/20
[58] Field of Search ............ 361/93, 99, 103, 24, 361/31, 85, 106, 380, 392, 394, 395, 399; 338/20, 22 R

[56] References Cited

U.S. PATENT DOCUMENTS

| | | | |
|---|---|---|---|
| 4,450,496 | 5/1989 | Doljack | 361/58 |
| 4,879,626 | 11/1989 | Kim | 361/93 |
| 4,907,126 | 3/1990 | Hendel | 361/394 |

Primary Examiner—Steven L. Stephan
Assistant Examiner—Adolf Berhane
Attorney, Agent, or Firm—William A. Drucker

[57] ABSTRACT

An electronic thermal relay is disclosed which can be associated with a multiphase electric load for generating a pre-alarm and/or an order for cutting off the power supply to the load in the case of a current overload in at least one phase or an imbalance between phase currents.

With each phase is associated a thermal element with a resistive heating element through which the phase current flows, a resistive sensor transmitting to a signal processing circuit a signal representative of the heating and a thermal memory mass. The heating element is thermally coupled to the sensor and to the memory mass by a coupling body whose thermal inertia is less than that of the memory mass.

8 Claims, 1 Drawing Sheet

ELECTRONIC THERMAL RELAY AND APPROPRIATE THERMAL ELEMENT

BACKGROUND OF THE INVENTION

The present invention relates to an electronic thermal relay which can be associated with a multiphase load for cutting off the power supply to this load when a current overload in at least one phase or an imbalance between the phase currents occurs. It also relates to a thermal element appropriate for such a relay.

The mechanical thermal relays usually used for protecting multiphase motors comprise a bimetallic strip per phase and a separable contact assembly. The bimetallic strips have all or part of the phase currents flowing therethrough and, when an overload occurs, the bimetallic strip of the overloaded phase or phases deflects and acts mechanically on a tripping mechanism, which causes opening of the contact assembly.

These known relays are very robust and of a low cost price. But, among other drawbacks, they do not provide sufficient precision of the tripping threshold under permanent operating conditions, they do not allow an alarm prior to tripping and they do not satisfactorily process hot starting of the motors with which they are associated.

To protect multiphase motors, electronic relays are also used. These relays comprise for each phase a detecting means such as a current transformer delivering an image signal of the intensity of the current in the phase, as well as an electronic processing circuit which receives and processes the signals delivered by the detecting means and delivers a tripping signal. These relays provide a pre-alarm and good accuracy under permanent operating conditions, but they are complicated which generates an increase in cost, size and the likelihood of defects. Furthermore, they only correctly process hot starts by memorizing the thermal condition of the motor which generates the above-mentioned drawbacks.

SUMMARY OF THE INVENTION

An object of the invention is particularly to provide, in an electronic thermal relay which can be associated with a multiphase load such as a motor, memorization which is simple and intrinsic to the means detecting the thermal state of the load.

Another object of the invention is to conciliate this simplicity of memorization with rapid detection of high overloads and satisfactory processing of hot starts of the motor.

A further object of the invention is to associate, with the electronic circuit of such a relay, detecting means having heating elements with low power consumption and considerably reduced heat dissipation with respect to the bimetallic strips of mechanical thermal relays.

A final object of the invention is to provide a detecting means of small thickness.

In accordance with the invention each detecting means comprises a thermal element with:

a resistive heating element through which all or part of the phase current flows, a relay sensor whose resistivity varies continuously with the temperature and which is electrically connected to the processing circuit for transmitting thereto an analog signal representative of the heating generated by the resistive element, a thermal mass capable of forming a thermal memory of heating of the load, and the heating element is thermally coupled to a thermal coupling body separate from the thermal memory mass, the body carrying the sensor being in thermal connection with the memory mass and having a lower thermal inertia than the memory mass.

The relay thus formed therefore contains detecting means which deliver to the electronic processing circuit respective analog signals evolving with a first time constant essentially dependent on the thermal inertia of the coupling body in the case of high or medium overload-i.e. for example about $2I_n$ to $17I_n$-and with a second higher time constant essentially dependent on the thermal inertia of the memory mass in the case of low overload-i.e. for example below about $2I_n$. The thermal memory mass is advantageously chosen as a function of the class of protection desired for the motor, for simplifying the manufacture of the thermal elements.

The low thermal inertia body is, preferably, a thin ceramic wafer having good heat conductivity, a first face of which carries a conductor, e.g. a thin conducting grid whose resistivity varies continuously with the temperature and a second face of which, opposite the first face, is in the immediate vicinity of, e.g. in contact with, the heating element. Advantageously, the heating element is a thin wafer made from copper alloy or another conducting alloy cut out and laid on the ceramic wafer; the thermal memory mass is made from a material with high thermal inertia in a small volume, e.g. asbestos cement.

BRIEF DESCRIPTION OF THE DRAWINGS

The following description of a non limitative embodiment of the invention refers to the accompanying drawings in which.

DESCRIPTION OF THE PREFERRED EMBODIMENTS

Figure 1:
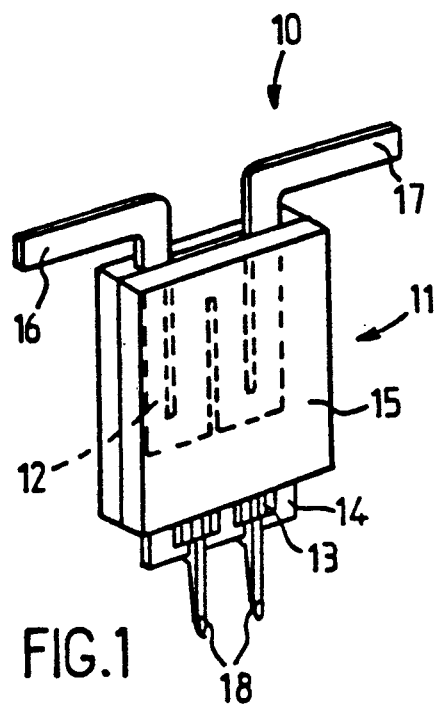
FIG. 1 shows in perspective a detecting means belonging to the electronic thermal relay according to the invention.
Figure 2:
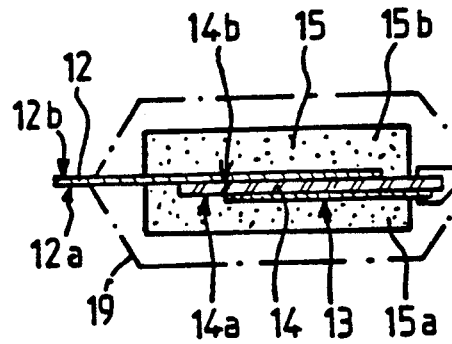
FIG. 2 is a schematic side view of this means.

The detecting means 10 illustrated in FIGS. 1 and 2 is a thermal element 11 comprising a resistive heating element 12, a sensor 13 carried by an insulating coupling body and a thermal memory mass 15.

Each detecting means is associated with a phase of a multiphase load such as a motor; it may be connected by connecting conductors at the ends 16, 17 of the heating element 12 to pins or terminals of a respective pole of the electronic thermal relay, as will be explained further on with reference to FIG. 4.

The resistive heating element or heater 12 is formed by a thin wafer of copper or appropriate conducting alloy preferably cut in meanders but being possibly arranged differently. Sensor 13 is a conducting grid of small thickness, e.g. made from nickel, deposited on a thin alumina wafer 14 which forms the electrically insulating thermal coupling body. Pins 18 for connection with the electronic processing circuit provided in the relay are connected to the grid of sensor 13. The heating element 12 consumes but little current and has reduced thermal dissipation. It can be seen that the detecting means has a small thickness.

The thermal memory mass 15 is of an electrically insulating material with high thermal inertia with respect to that of wafer 14 carrying the sensor. This material is for example made from asbestos cement. The memory mass 15 is capable of memorizing the thermal state of the motor and simulating approximately the heating thereof in the case of an overload and cooling in the case of a cut in the power supply of the phase considered, following tripping due to the relay or an interruption due to an element external to the relay. The memory mass 15 and its inertia are determined depending on the class of protection required for the motor with which the electronic thermal relay is associated.

In the preferred embodiment of FIG. 2, the thermal coupling wafer 14 has on a first face 14a the layer of sensor 13. On a second face 14b, opposite the first one, wafer 14 is in direct contact with heater 12 which is laid flat.

The thermal memory mass 15 is formed of two half shells 15a, 15b. Half shell 15a is disposed on the same side as the face 14a of the thermal coupling wafer 14; it is in contact both with this face and grid 13 and with a face 12a of heater 12. The half shell 15b is disposed on the opposite side of the coupling wafer 14 and it is in contact with the opposite face 12b of heater 12 and with the face 14b of the wafer. The memory mass 15 may also be formed in a single piece.

Parts 12-15 may be encapsulated in an electrically insulating case 19 shown with a chain-dotted line in FIG. 2. This insulating case may, in a variant, itself form the memory mass 15.

Figure 3:
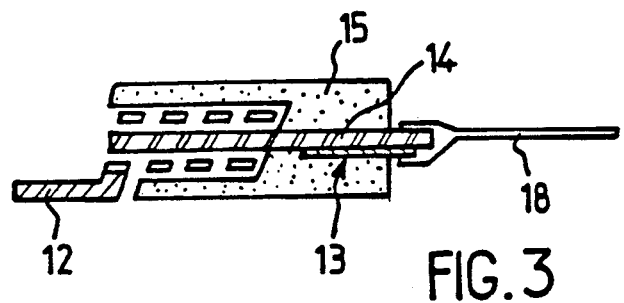
FIG. 3 is a similar view of a variant of the detecting means.

In the embodiment of FIG. 3, heater 12 is a conductor wound about the thermal coupling wafer 14. Sensor 13 is disposed on one side of wafer 14 on a portion thereof which is either not covered by the wound conductor or covered by this conductor but with interpositioning of an insulating layer or a suitable insulating means. The thermal memory mass 15 collects here again the heat coming essentially from heater 12 and secondarily from wafer 14.

Figure 4:
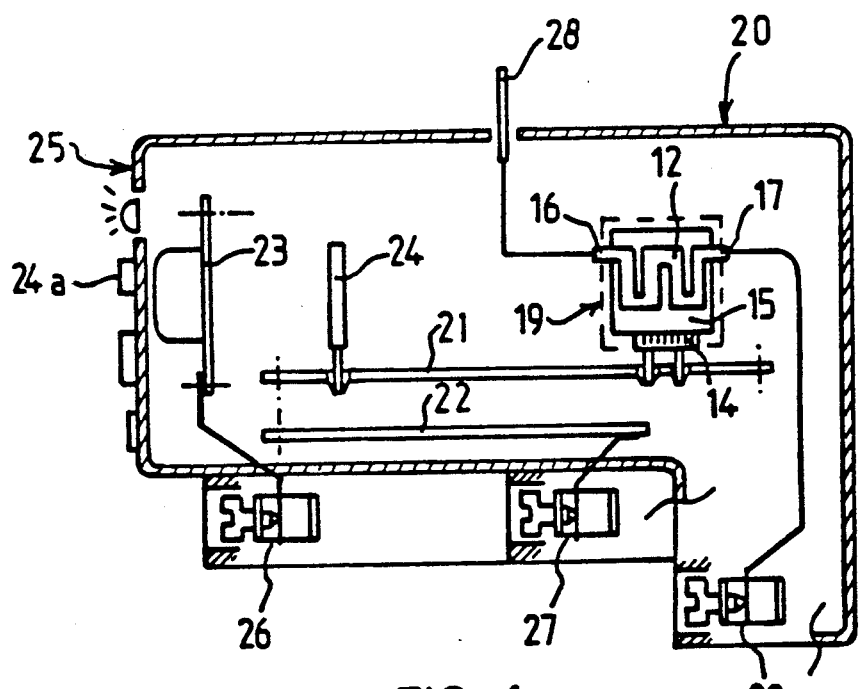
FIG. 4 is a schematic view of an electronic thermal relay according to the invention.

FIG. 4 illustrates one embodiment of the electronic thermal relay having detecting means of the type described. This relay has a case 20 in which three printed circuit cards 21, 22, 23 are housed. The detection card 21 carries, for example, three thermal elements 11 each associated with a phase, as well as a thermal compensation element 24 delivering an analog signal representative of the ambient temperature, by means of a sensor whose resistivity varies continuously with the temperature prevailing inside the case. Element 24 may be disposed in series with element 11.

When the electronic thermal relay is to be placed close to the motor to be protected, the thermal compensation element 24 may be omitted.

In an advantageous embodiment, a selector 24a is provided which controls a switch associated with the thermal compensation element for bringing the latter into or out of service depending on the conditions of use.

The processing card 22 carries the electronic processing circuit. This circuit does not need elements defining a thermal memory since it is already provided by the memory masses 15.

The regulation and output card 23 carries both the regulation elements communicating with regulation and signalling elements provided on the front face 25 of the case 20 and output relays connected via terminals 26 to external signalling or control means.

Cards 21-23 may, of course, be reduced to two printed circuit cards, even a single card.

Terminals 27 are provided in the case for supplying cards 21-23 with power. Power terminals 28, 29 connect the respective ends 15, 17 of the heaters to the circuit supplying the windings of the motor.

Of course, the electronic thermal relay may be arranged differently. It may in particular be included in a protection apparatus providing different functions, particularly those of contact maker and/or contract breaker.

What is claimed is:

1. An electronic thermal relay which can be associated with a multiphase electric load for cutting off the power supply to the load in the case of a current overload in at least one phase or an imbalance between phase currents, this relay comprising in a case:
   i. a detecting means per phase for delivering a signal depending on the intensity of the phase current,
   ii. an electronic processing circuit which receives and processes the signals delivered by the detecting means, this circuit comprising a logic means capable of delivering a tripping signal, each detecting means being a thermal element with a resistive heating element through which the phase current passes, a relay sensor having a resistivity which varies continuously with the temperature and which is electrically connected to the processing circuit for transmitting thereto an analog signal representative of the heating produced by the resistive element, and a thermal mass forming a thermal memory of the heating of the load, said heating element being thermally coupled to a thermal coupling body distinct from the thermal memory mass, said body carrying the sensor annd being in thermal connection with the memory mass and having a lower thermal inertia than the thermal mass.

2. The relay as claimed in claim 1, wherein said low thermal inertia coupling body is a thin ceramic wafer with good heat conductivity, which presents a first face carrying said sensor whose resistivity varies continuously with the temperature and a second face, opposite the first face, which is in the immediate vicinity of said heating element.

3. The relay as claimed in claim 2, wherein said heating element is a thin wafer made from a conducting alloy cut into meanders and laid flat on said second face of said thin ceramic wafer, the sensor being a thin conductor deposited on the first face of said ceramic wafer.

4. The relay as claimed in claim 1, wherein said low thermal inertia coupling body in a thin wafer with good heating conductivity which carries the sensor and about which is wound an electric conductor forming said heating element, and said thin wafer is in contact with said thermal mass.

5. The relay as claimed in claim 1, wherein said thermal mass has high thrmal inertia in a low volume, is electrically insulating, is in contact with the thermal coupling body and is defined as a function of the desired class of protection for the multiphase load with which the relay is associated.

6. The relay as claimed in claim 1, wherein said case houses a compensation detecting means comprising a sensor whose resistivity varies continuously with the temperature prevailing inside the case, said phase detecting means and said compensation detecting means being mounted on the same printed circuit.

7. The relay as claimed in claim 6, wherein a selector controls a switch associated with said compensation detecting means for selectively bringing detecting means into or out of service.

8. A detecting means for an electronic thermal relay, said detecting means comprising a thermal element having:
 a resistive heating element through which a phase current flows,
 a resistive sensor whose resistivity varies continuously with the temperature and which is connected electrically to a processing circuit for transmitting thereto an analog signal representative of the heating produced by the resistive heating element,
 a thermal mass capable of forming a thermal memory of the heating of a load,
 and said heating element is thermally coupled to a thermal coupling body distinct from the thermal memory mass, said body carrying the sensor, being in contact with the memory mass and having a lower thermal inertia than that of the thermal mass.

* * * * *